Jan. 18, 1955

T. ADDISON 2,699,695

TABLE SPINDLE CONSTRUCTION

Filed July 31, 1952

INVENTOR.
Tom Addison
BY
Orin O. B. Garner
Atty.

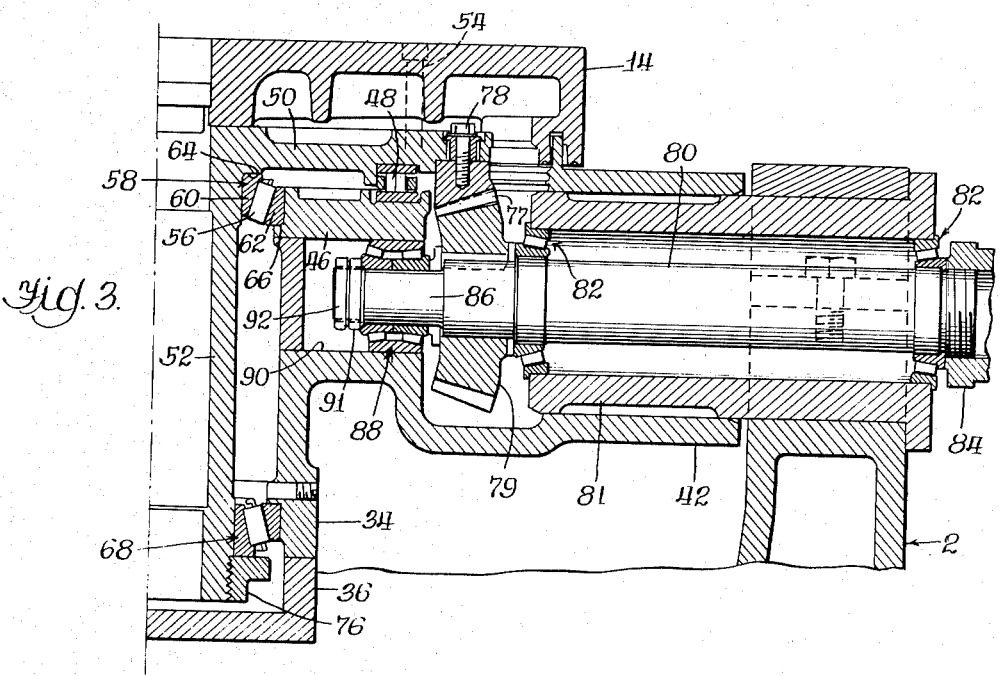
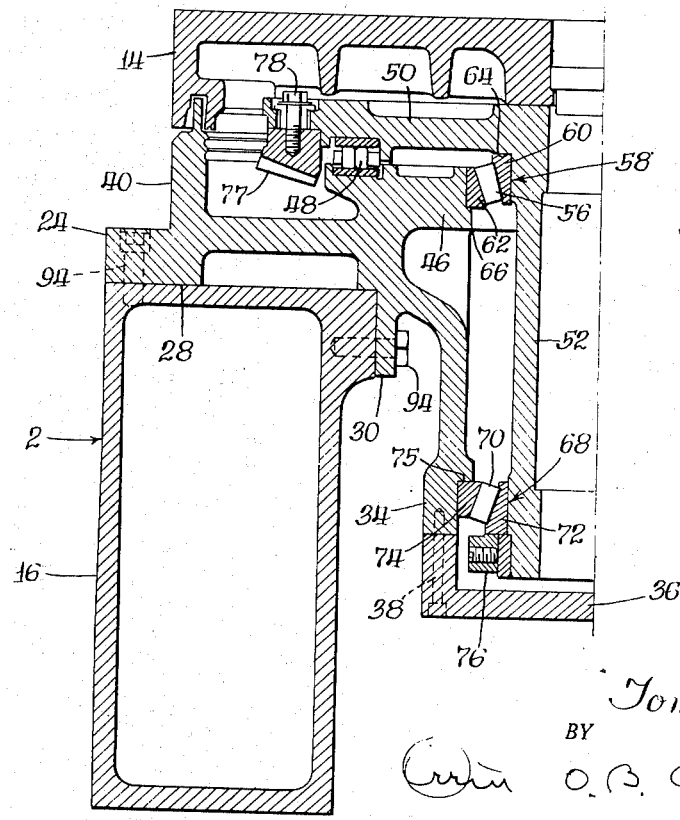

United States Patent Office 2,699,695
Patented Jan. 18, 1955

2,699,695
TABLE SPINDLE CONSTRUCTION

Tom Addison, Cincinnati, Ohio, assignor to American Steel Foundries, Chicago, Ill., a corporation of New Jersey Application July 31, 1952, Serial No. 301,936

6 Claims. (Cl. 77—4)

This invention relates to vertical boring mills and more particularly to an improved support for the rotatable table and its spindle.

A primary object of the invention is to facilitate adjustment of the spindle bearings.

A further object of the invention is to eliminate the necessity for a pit beneath the spindle to accommodate adjustment of its bearings.

Another object of the invention is to facilitate removal of chips which are cut from the work by one or more tools engageable therewith as the work is rotated by the table.

Still another object of the invention is to accommodate inspection and replacement of the driving means for rotating the table.

A further object of the invention is to facilitate assembly and disassembly of the table and the drive mechanism for rotating the same.

The foregoing and other objects and advantages of the invention will become apparent from a consideration of the following specification and the accompanying drawings, wherein:

Figure 3 is a fragmentary transverse vertical sectional view through the mill in a vertical plane bisecting the table as indicated by the line 3—3 of Figure 1, and Figure 4 is a sectional view through the mill in a vertical plane bisecting the drive shaft for the table as indicated by the line 4—4 of Figure 1.

Figure 1:
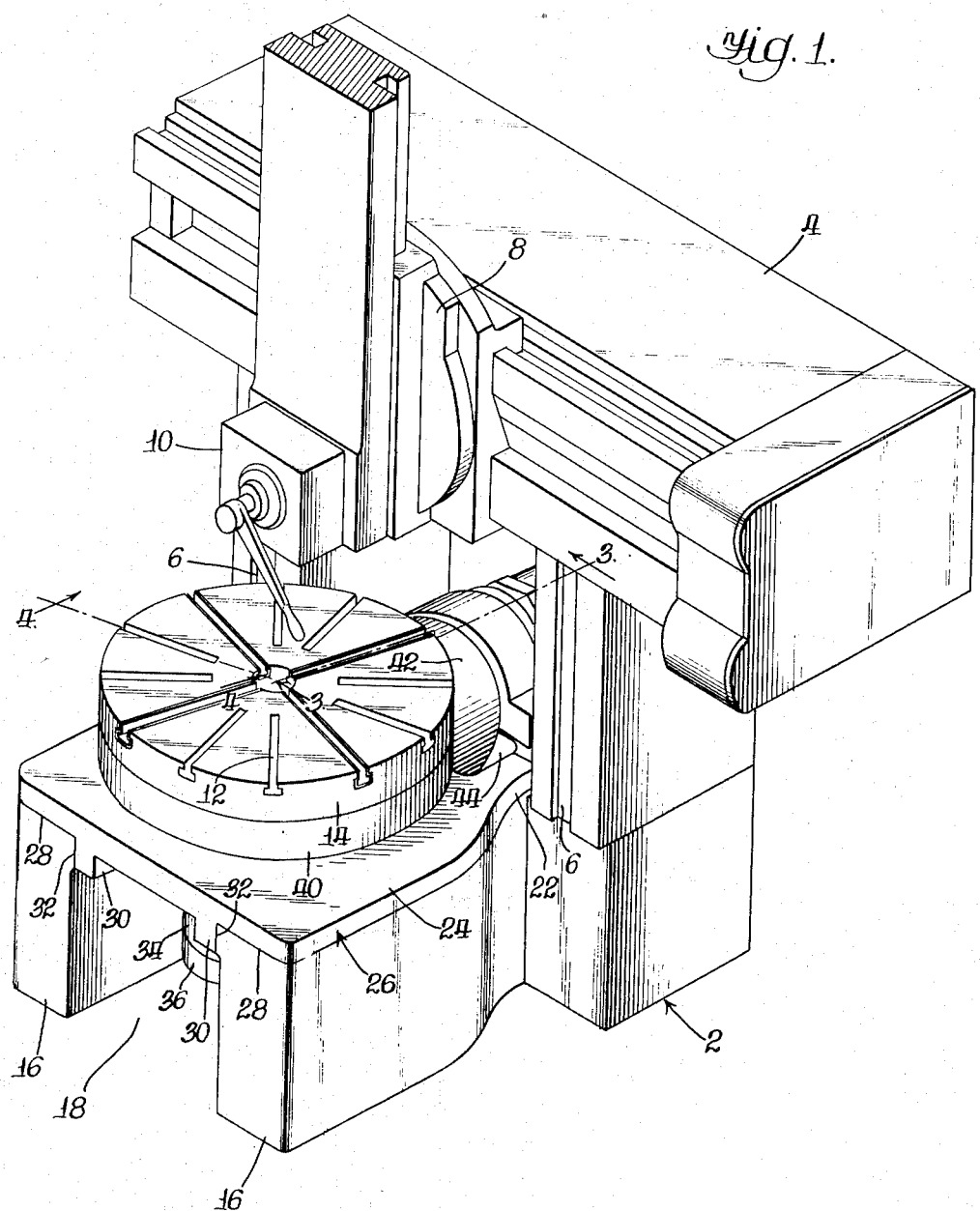
Figure 1 is a fragmentary perspective view of a boring mill embodying the invention.
Figure 2:
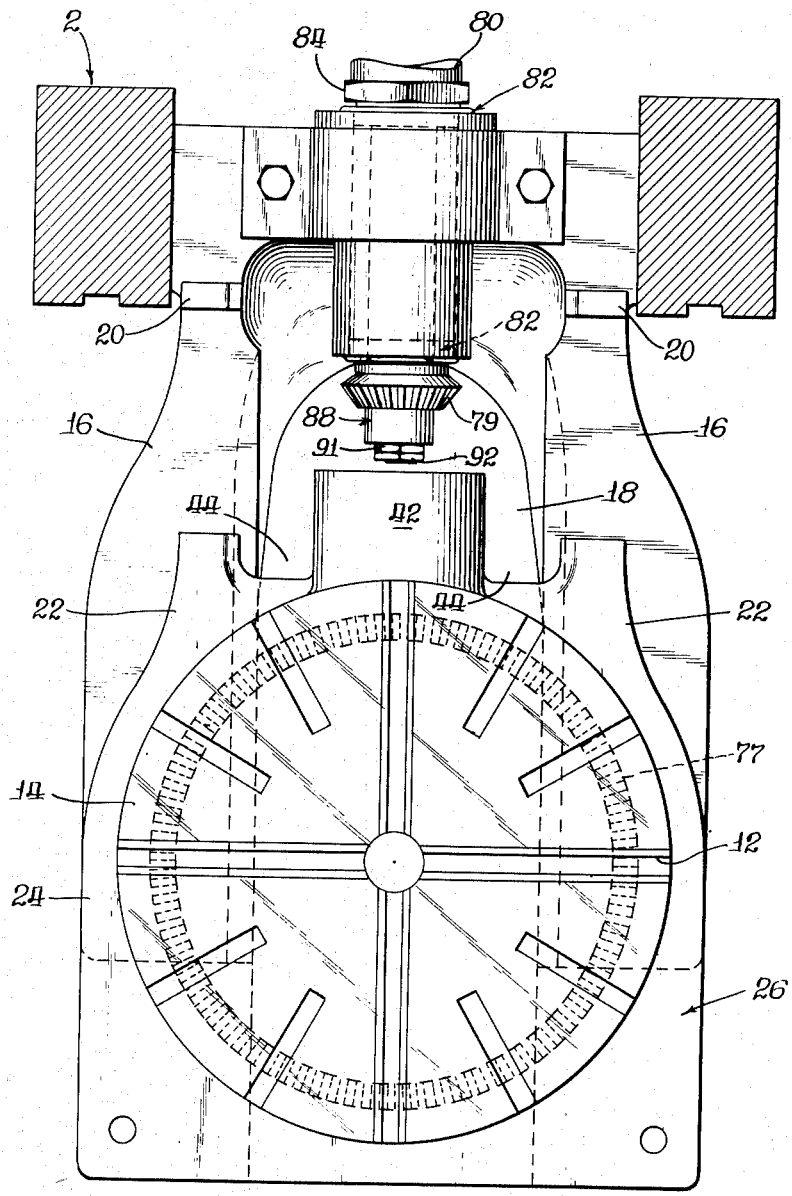
Figure 2 is a top plan view of the mill shown in Figure 1 with the table and its spindle moved to bearing adjusting position.

Describing the invention in detail and referring first to the assembly view in Figures 1 and 2, the vertical boring mill illustrated therein comprises a bed or base 2, preferably in a form of an iron casting on which a horizontal rail 4 is mounted in the usual manner for guided vertical movement along grooves 6 of the base to accommodate vertical adjustment of the rail 4.

The rail carries a conventional head or turret 8 which may be rotatably and horizontally adjusted on the rail 4 in the usual manner, said head comprising a tool holder 10 adapted to carry a tool (not shown) for cutting or milling a work piece (not shown) secured by a chuck 12 of a rotatable table 14.

The base 2, as best seen in Figures 1 and 2, comprises spaced forwardly projecting arms or jaws 16 defining a cavity or well 18 for a purpose hereinafter described. The arms 16 are provided with vertical stop lugs 20 (Figure 2) for engagement with fingers 22 of a plate 24 forming part of a table and spindle support, generally designated 26. The underside of the plate 24 is slidably seated as at 28 (Figure 1) on the upper edges of the arms 16 in complementary flat face engagement therewith. The support 26 also comprisees flanges or ribs 30 depending from the underside of the plate 24 and slidably engaged with mutually facing inner surfaces of the arms 16 in complementary flat face engagement therewith as at 32.

The support also comprises a depending cylinder or casing 34, as best seen in Figures 1 and 4, the lower end of the casing 34 having a detachable cap 36 removably secured thereto as by one or more screws 38 for a purpose hereinafter described.

The plate 24 is formed on its upper surface with an upstanding outer annular flange 40 (Figures 1 and 4) which merges with a hub 42. The hub is arranged between the spaced fingers 22 of the plate 24 and defines chip holes 44 therewith accommodating passage of chips from the work into the well 18 as hereinafter described.

The plate 24 is also provided with an annular web or flange 46 within the flange 40 and substantially concentric therewith, as best seen in Figures 3 and 4, said flange 46 supporting conventional roller bearings 48 which in turn support a flange 50 of a hollow spindle 52. The flange 50 of the spindle is secured in any desired manner as by screws 54 (Figure 3) to the table 14 at the underside thereof, whereby the spindle 52 and its flange 50 support the table.

The spindle is additionally supported by conical roller bearings 56 of a conventional roller bearing unit 58 which comprises inner and outer races 60 and 62 confining the bearings 56 therebetween. The inner race 60 is seated against a downwardly facing surface or shoulder 64 of the flange 50, and the outer race 62 is carried by an upwardly facing surface or shoulder 66 of the web 46. The roller bearings 56 converge downwardly to support the weight of the table 14 and spindle 52.

The lower end of the spindle is provided with another conventional roller bearing unit 68 comprising upwardly converging conical rollers 70 confined between inner and outer races 72 and 74. The outer race 74 is seated against a downwardly facing surface 75 of the casing 34 and the inner race 72 is seated against an upwardly facing surface of an adjusting nut 76 threaded on the lower end of the spindle, whereby said nut upon removal of the cap 36 may be rotated to adjust the bearing units 58 and 68.

The underside of the spindle flange 50 is provided with a ring gear 77 secured thereto in any convenient manner as by screws 78, said gear 77 being meshed with an inwardly tapered pinion gear 79 keyed to a drive shaft 80 which extends into the before mentioned hub 42 and is slidably and rotatably mounted therein as hereinafter described.

The shaft 80 is rotatably mounted within a sleeve 81 which is slidably fitted within the hub 42, said shaft 80 being mounted within the sleeve 81 by reversely arranged roller bearing units 82 similar to the above described units 58 and 68. A nut 84 is threaded on the shaft 80 to adjust the bearing units 82.

Inwardly of the gear 79, the shaft 80 is provided with a smaller diameter portion 86 rotatably mounted by a double roller bearing unit 88 which is slidably fitted within a complementary opening 90 of the support 26, said unit 88 being secured on the shaft 80 as by a nut 91 and locking nut 92.

The support 26 is normally fixed to the base 2, as by screws 94 (Figure 4) threaded into the arms 16 to anchor the plate 24 and ribs 30 thereto under normal operating conditions, wherein the table 14 is rotated by the drive shaft 80, and the work (not shown) is engaged by a tool (not shown) carried by the tool holder 10. Chips removed from the work which fall behind the table drop into the chip holes 44 and fall between the arms 16 into the well 18 and may be removed therefrom by a rake or other convenient tool (not shown). The few chips which collect on the hub 42 and the fingers 22 may be pushed into the chip holes 44 for convenient removal as above described.

In the event that adjustment of the spindle bearing units 58 and 68 is desirable as occasionally occurs in service, the screws 94 are removed, and the support is slidably moved forwardly as shown in Figure 2 to a position whereat a workman may readily remove the cap 36 on the lower end of the casing 34 for the purpose of adjusting the nut 76. If replacement of the pinion gear 79 for the bearings 82 or 88 for the drive shaft 80 is desired, the support 26 may be moved further forwardly to expose the nuts 91 and 92 and may even be entirely removed from the arms 16 of the base 2.

It may be noted that slidable movement of the support 26 forwardly and rearwardly as above described is accommodated by the slidable fit of the sleeve 81 in the hub 42, and by the slidable fit of the bearing unit 88 in the opening 90 of the support, and also by the inwardly tapered configuration of the pinion gear 79.

In assembling the support 26, as, for example, after adjustment of the bearing units 58 and 68, the support 26 is slidably moved rearwardly along the arms 16 until the fingers 22 of the plate 24 contact the stop lugs 20 of the base under which conditions the gears 77 and 79 are again meshed as shown in Figures 3 and 4, whereupon the support is again secured by the screws 94, and the mill is in condition for operation.

I claim:

1. A boring mill comprising a base having spaced integral arms projecting forwardly therefrom, said arms defining a cavity therebetween, a support comprising a plate slidably seated on said arms and in complementary flat face engagement therewith, said support having complementary flat face engagement with said arms along mutually facing inner surfaces thereof, an upstanding substantially annular flange on the top of said plate, a rearwardly projecting hub formed on said plate and merging with said flange, a spindle having a flange rotatably supported by said plate, a casing connected to the plate and depending therefrom and receiving said spindle, a work supporting table fastened to said spindle flange, a ring gear secured to the underside of said spindle flange, a shaft projecting into said hub, a sleeve on said shaft slidably mounted in said hub, an inwardly tapered pinion gear keyed to said shaft and meshed with said ring gear, bearing means in said casing for said spindle, a detachable cap on the lower end of said spindle covering said bearing means, and readily detachable means connecting the support to the base, whereby upon detachment of said detachable means said plate may be slidably moved forwardly along said arms to disengage said gears and to accommodate removal of said cap and adjustment of said bearing means, said arms being free from connection with each other at their forward ends so that said cavity is open at the forward end thereof to afford access to said cap from the forward end of said cavity.

2. A boring mill according to claim 1, wherein the plate is formed with spaced rearwardly projecting fingers defining chip holes rearwardly of the table at opposite sides of the hub, said fingers being engageable with abutments of the frame to limit rearward movement of the plate along said arms.

3. A boring mill comprising a base having means for carrying an associated tool, spaced integral arms on said base projecting forwardly therefrom and defining a cavity between said arms, a plate slidably supported on said arms for movement forwardly and rearwardly therealong, said plate having a depending casing in said cavity, a spindle rotatably supported by the plate and extending downwardly into said casing, adjustable bearing means in said casing for said spindle, a cap detachably mounted on the lower end of said casing to cover said bearing means, a table secured to the spindle and adapted to carry an associated work piece for engagement with said tool, driving means for said table comprising a ring gear fixed with respect thereto, said driving means comprising a forwardly tapering pinion gear meshed with said ring gear, a shaft keyed to said pinion gear and projecting rearwardly therefrom, a sleeve on said shaft slidably mounted in an opening of said plate, antifriction bearings between said sleeve and said shaft, and detachable means anchoring the plate to the base, whereby upon detachment of said detachable means said plate may be slidably moved forwardly on said arms to disengage the ring gear from the pinion gear and to move the casing forwardly in said cavity, thereby facilitating removal of the cap and adjustment of the bearing means in the casing, said arms being free from connection with each other at their forward ends so that said cavity is open at the forward end thereof to afford access to said cap from the forward end of said cavity.

4. A boring mill according to claim 3, wherein the plate is provided with depending ribs slidably engaging the legs along mutually facing areas thereof in said cavity.

5. A boring mill according to claim 3, wherein the plate is provided with a chip hole rearwardly of the table and communicating with the cavity so that chips falling from the work rearwardly of the table fall through said hole into said cavity for removal from the forward end of the cavity.

6. A boring mill according to claim 5, wherein the chip hole is defined by spaced rearwardly projecting fingers of the plate, and the base is provided with upstanding abutments against which the fingers are engageable to limit rearward movement of the plate during assembly thereof.

References Cited in the file of this patent

UNITED STATES PATENTS

| 638,695 | Beeley | Dec. 12, 1899 |
| 2,445,497 | Schurr | July 20, 1948 |

FOREIGN PATENTS

| 523,027 | France | Apr. 13, 1921 |